United States Patent
Liu et al.

(10) Patent No.: US 12,085,126 B2
(45) Date of Patent: Sep. 10, 2024

(54) BEARING CAGE AND APPLICATIONS THEREOF

(71) Applicants: SKF (China) Co Ltd, Shanghai (CN); Aktiebolaget SKF, Gothenburg (SE)

(72) Inventors: JiaWei Liu, Suzhou (CN); Meng Zhang, Shanghai (CN); He Zhu, Shanghai (CN)

(73) Assignees: Aktiebolaget SKF, Gothenburg (SE); SKF (CHINA) CO LTD, Shanghai (CN)

( * ) Notice: Subject to any disclaimer, the term of this patent is extended or adjusted under 35 U.S.C. 154(b) by 181 days.

(21) Appl. No.: 17/471,273

(22) Filed: Sep. 10, 2021

(65) Prior Publication Data
US 2022/0112918 A1    Apr. 14, 2022

(30) Foreign Application Priority Data

Oct. 10, 2020 (CN) .......................... 202011077791.X

(51) Int. Cl.
*F16C 33/38* (2006.01)
*F16H 49/00* (2006.01)

(52) U.S. Cl.
CPC ....... *F16C 33/3887* (2013.01); *F16H 49/001* (2013.01); *F16C 2361/61* (2013.01)

(58) Field of Classification Search
CPC .... F16C 33/3887; F16C 33/467; F16C 34/41; F16C 34/34–418
See application file for complete search history.

(56) References Cited

U.S. PATENT DOCUMENTS

| | | | | |
|---|---|---|---|---|
| 9,097,282 | B2 * | 8/2015 | Adane | F16C 33/416 |
| 2016/0265593 | A1 * | 9/2016 | Shi | F16C 19/26 |
| 2018/0283518 | A1 * | 10/2018 | Kataoka | F16C 19/163 |

FOREIGN PATENT DOCUMENTS

| | | | | | |
|---|---|---|---|---|---|
| CN | 106662152 | A | * | 5/2017 | ............. F16C 19/16 |
| JP | 2001082486 | A | * | 3/2001 | ............. F16C 33/416 |
| JP | 2004036825 | A | * | 2/2004 | ............. F16C 19/166 |
| JP | 2005331097 | A | * | 12/2005 | ............. F16C 19/522 |
| JP | 5012498 | B2 | * | 8/2012 | ............. F16C 33/416 |
| WO | WO-2010066293 | A1 | * | 6/2010 | ......... F16C 33/3862 |
| WO | WO-2019235578 | A1 | * | 12/2019 | ............. F16C 33/66 |

* cited by examiner

*Primary Examiner* — Bobby Rushing, Jr.
(74) *Attorney, Agent, or Firm* — GARCIA-ZAMOR INTELLECTUAL PROPERTY LAW, LLC; Ruy Garcia-Zamor

(57) ABSTRACT

A ball bearing cage having pockets for accommodating spherical rolling elements. At least one of the pockets has a substantially conical inner surface whose diameter is gradually enlarged from the inside to the outside in a specific range in the radial direction of the bearing. On the basis of the above-mentioned cage, the present invention also provides a bearing using the cage, a harmonic drive and related mechanical devices.

10 Claims, 2 Drawing Sheets

BEARING CAGE AND APPLICATIONS THEREOF

CROSS-REFERENCE TO RELATED APPLICATIONS

This application claims priority to Chinese Patent Application no. 202011077791.X, filed Oct. 10, 2020, the contents of which is fully incorporated herein by reference.

TECHNICAL FIELD

The invention relates to a bearing cage which is especially suitable for thin-walled bearings used in harmonic drives.

BACKGROUND ART

Harmonic drives have been widely used in the field of transmission due to their characteristics of large transmission ratio, stable operation and low noise, precision and reliability, as well as long lives. In general, the structure of a harmonic drive mainly includes a rigid circular spline with internal teeth, a flexible spline with external teeth, and a wave generator for radial deformation of the flexible spline, wherein the wave generator is mainly composed of an elliptical cam and a flexible thin-walled bearing fitted on the cam through elastic deformation.

FIG. 1 is a schematic diagram of the rolling elements running in an elliptical track (i.e. raceway) supported by the wave generator cam 1. In the case of constant angular velocity, the speed of the rolling elements in the raceway is not consistent (the linear velocity is equal to the product of the angular velocity and the radius). Therefore, the linear velocity of the rolling elements in the range of the load-bearing area A corresponding to the elliptical major axis is relatively large, and the linear velocity of the rolling elements in the non-load-bearing zone C corresponding to the elliptical minor axis is relatively small. The varying linear velocity causes the circumferential spacing of the rolling elements on the elliptical track to not always be consistent with the designed circumferential spacing of the pockets. In order to prevent the rolling elements from colliding with the pockets and causing the cage to break, the prior art generally adopts the solution to increase the pocket gap (the difference in size between the pocket and the rolling element forms a pocket gap). However, the method of increasing the pocket gap in the non-load-bearing area C is not only unfavorable for guiding the cage, but also easily causes noise and vibration problems. Practice has proved that the vibration amplitude of a cage with a large pocket gap is much greater than that of a cage with a small pocket gap. Therefore, reasonable optimization of the pocket gap is of great significance to the stable operation of the cage and the vibration and noise reduction of the bearing.

SUMMARY OF THE INVENTION

The present invention provides a ball bearing cage having pockets for accommodating spherical rolling elements wherein at least one of the pockets has a substantially conical inner surface whose diameter is gradually enlarged from the inside to the outside in a specific range in the radial direction of the bearing.

With the above solution, the roughly tapered inner surface of the pocket(s) can provide a pocket gap that is compatible with the circumferential area of the rolling element (load-bearing area A to non-load-bearing area C) according to the radial displacement of the rolling element and is particularly suitable for elliptical applications of various flexible bearings including harmonic drives.

On the basis of the above-mentioned cage, the present invention also provides a bearing using the cage, a harmonic drive and related mechanical devices.

The various embodiments and beneficial technical effects of the present invention will be described in detail below with reference to the accompanying drawings.

DETAILED DESCRIPTION OF EMBODIMENTS

In the following description, terms indicating directions, such as "axial", "radial" and "circumferential direction", unless otherwise specified or delimited, refer to the axial, radial and circumferential directions of the cage or the bearing to which the cage belongs.

Figure 1:
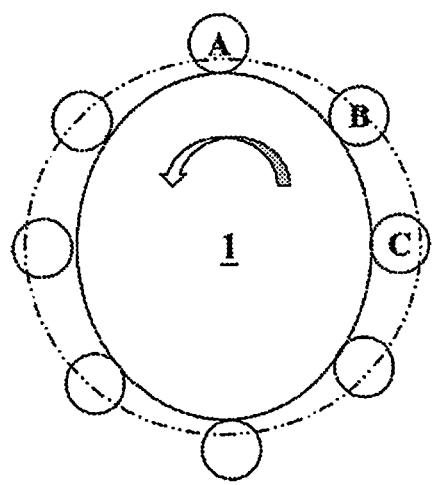
FIG. 1 shows a schematic diagram of the rolling elements running in the elliptical track supported by the cam of the wave generator.

FIG. 1 takes the wave generator as an example to show the state of the rolling elements running in the elliptical track supported by the cam of the wave generator. The elliptical contour of the cam forces the flexible thin-walled bearing fitted on it to form the elliptical raceway as shown in the figure. Due to the existence of the pocket gaps, the cage can maintain its original ring shape during operation, which is basically the same as the bearing pitch circle (the circle formed by the centers of the rolling elements) before the bearing deforms. This causes the rolling elements running in the elliptical raceway to undulate in the radial direction relative to the annular cage. Specifically, in the load-bearing area A located near the elliptical major axis, the rolling element is pushed out in the radial direction so that its center is higher than the pitch circle. In the non-load-bearing zone C located near the elliptical minor axis, the rolling element fall inward in the radial direction so that its center is lower than the pitch circle. In the transition area B between the load-bearing area A and the non-load-bearing area C, the center of the rolling element is just substantially flush with the pitch circle in the radial direction.

Figure 2A:
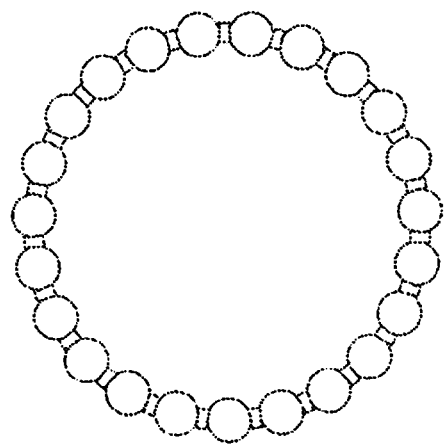
FIG. 2a shows an axial schematic diagram of a cage of the present invention in the state of including balls.
Figure 2B:
FIG. 2b shows a radial schematic diagram of a cage of the present invention in the state of including balls.
Figure 3A:
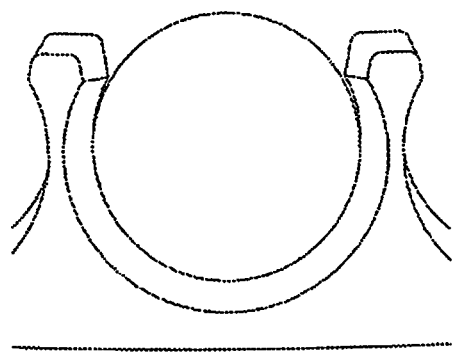
FIG. 3a is a radial schematic diagram of a pocket unit with a ball.

FIGS. 2 and 3 show the structural schematic diagrams of a cage and its pockets of the present invention from different viewing angles, respectively. It can be seen from FIG. 3 that the pocket unit (hereinafter also referred to as the "pocket") 30 has a substantially conical inner surface 30a whose diameter gradually enlarges from the inside to the outside in the radial direction. Such a substantially conical inner surface 30a can use the undulating displacement of the rolling elements in the radial direction to synchronously create pocket clearance adapted to the location of the rolling elements on the elliptical track. Specifically, when the rolling elements travel from the non-load-bearing zone C to the load-bearing zone A, the rolling elements are displaced radially outward, which causes the clearance between the rolling elements and the pockets (which is the pocket gap) to gradually enlarge, just satisfying the need of the rolling elements for larger circumferential clearance in the load-bearing area. On the contrary, when the rolling elements travel from the load-bearing area A to the non-load-bearing area C, the rolling elements are displaced radially inward, which causes the clearance between the rolling elements and the pockets to gradually shrink, just satisfying the need for the rolling elements to guide the cage in a more suitable way in the non-load-bearing area.

In the above description, the "substantially conical inner surface" is a broad concept, which includes not only standard conical surfaces, but also paraboloids and hyperboloids. In fact, any smooth curved surface suitable for maintaining rolling elements, as long as the diameter gradually expands from the inside to the outside in the radial direction, can achieve the purpose of automatically adjusting the pocket clearance along with the fluctuations of the rolling elements and so should be all understood as the "substantially conical inner surface" described in the present invention.

Figure 3B:
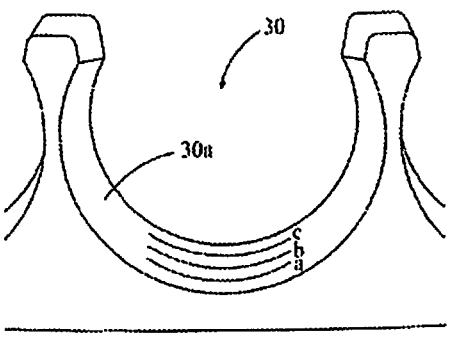
FIG. 3b is a radial schematic diagram of a pocket unit without a ball.

FIG. 3b is a radial schematic diagram of a pocket unit without a ball, wherein an upper limit position a, a transition position b, and a lower limit position c marked radially from the outside to the inside correspond to the radial positions of the center of the rolling element in the load-bearing zone A, the transition zone B and the non-load-bearing zone C, respectively. From the foregoing description it can be known that the transition position b should exactly correspond to the position height of the bearing pitch circle in the radial direction, so it is also called "pitch circle position" in the present invention. It is easy to understand that for the elliptical track of a specific cam shape, the rolling elements will always reciprocate within the radial interval defined by the upper limit position a and the lower limit position c (hereinafter also referred to as the "undulation range"). Therefore, as long as the inner surface of the pocket has a substantially tapered inner surface within the undulation range, the objective of the present invention can be achieved.

Figure 4:
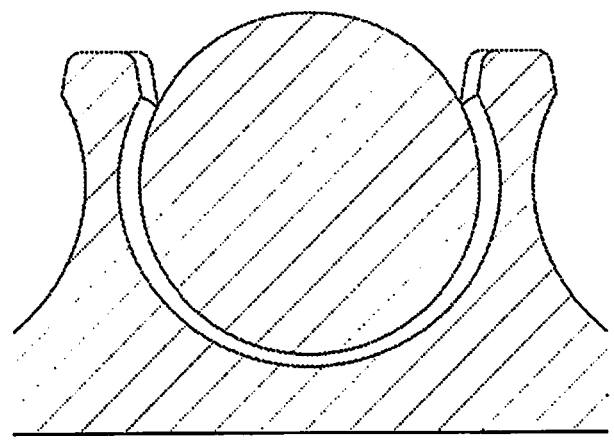
FIG. 4 shows a cross-sectional view of a pocket at the position of the bearing pitch circle from a radial perspective.

The main thing that needs to be adjusted when the rolling elements are running in the elliptical raceway are the pocket clearance in the circumferential direction. The change in the pocket clearance of the rolling elements in the axial direction does not help to improve the guidance of the rolling elements to the cage in the circumferential direction, but easily causes vibration and noise problems. Therefore, as a preferred embodiment, the substantially conical inner surface of the pocket is preferably a substantially elliptical cone surface. FIG. 4 shows the cross-sectional view of a pocket at the height of the bearing pitch circle from a radial perspective. It can be seen from the figure that the cross-section of the pocket is an elliptical cross-section, in which the elliptical major axis (not shown) corresponds to the circumferential direction of the bearing, and the elliptical minor axis (not shown) corresponds to the axial direction of the bearing. With this design, when the rolling elements reciprocate in the radial direction within the undulating range, the pocket clearance in the circumferential direction of the bearing will be adaptively adjusted, while the pocket clearance in the axial direction of the bearing will not change significantly. This is obviously beneficial to limit the interaction between the cage and the rolling elements in the axial direction, so as to ensure the minimum axial clearance during the running of the rolling elements.

In the present invention, the "substantially elliptical cone surface" is also a generalized concept, which includes not only the standard elliptic cone, but also the elliptic paraboloid and the elliptic hyperboloid. In fact, any smooth curved surface suitable for maintaining the rolling element can achieve the purpose of the present invention as long as its diameter is gradually enlarged from the inside to the outside in the radial direction and has a substantially elliptical cross-section in the radial viewing angle, and therefore should be understood as the said roughly elliptical cone surface. As an interpretation in the present invention, the roughly elliptical cross-section should be understood as any rounded oblong figure that allows the rolling element to have sufficient space for movement within the length (corresponding to the circumferential direction) of the cross-section. For example, the roughly elliptical cross-section can be a standard elliptical shape, or it can be a shape similar to the athletics stadium track (which is connected by two straight tracks and two semi-circular arcs), or even a rectangle shape with rounded corners.

In the present invention, both the ellipticity of the roughly elliptical cross-section (defined as the ratio of the major axis to the minor axis in the present invention) and the conicity of the roughly elliptical cone (the ratio of the diameter difference between the large and small ends of the cone to the height of the cone) are the key parameters for defining and adjusting the pocket clearance which includes the axial clearance and the circumferential clearance. In a typical application of the wave generator, the ellipticity is preferably between 1.02 and 1.10, and the conicity of the elliptical cone surface in the direction of the elliptical major axis is preferably between 0.5±20% (that is, 0.4 to 0.6). It is not difficult to understand that as long as the conicity and ellipticity are designed reasonably, the self-adaptive adjustment mechanism of the pocket can just meet the needs of the circumferential pocket clearance and the axial pocket clearance of the rolling elements at different positions on the elliptical track.

Figure 5:
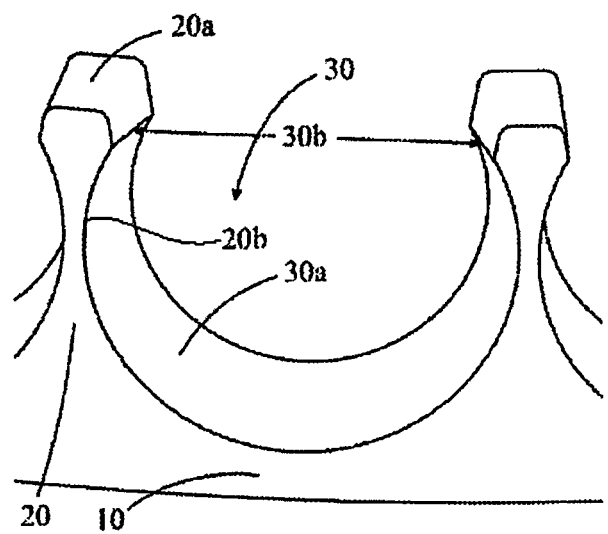
FIG. 5 is a perspective view of a pocket unit.

FIG. 5 is the perspective view of a pocket unit. As a specific embodiment, the cage of the present invention may be a one-way plug-in cage, including a substantially annular backbone 10 and prongs 20 extending from the backbone to one side in the axial direction. A pocket 30 is formed between adjacent prongs 20, and the free ends 20a of the adjacent prongs form a lock opening 30b of the pocket between the inner sides of the opening of the pocket 30. The pocket lock 30b on the one hand serves as a passage for the rolling elements to enter the pocket when the bearing is assembled, and on the other hand is used to prevent the cage from being separated from the rolling elements when the bearing is running. The prongs 20 may also comprise transverse sections 20b extending between the backbone 10 and the free end 20a. The free ends 20a may be wider than the transverse sections 20b of the prongs 20.

In the specific embodiment shown in FIG. 5, the size of the lock opening 30b gradually narrows from the outside to the inside in the radial direction of the bearing. Specifically, the size of the lock opening 30b at the position corresponding to the lower limit position c is significantly smaller than the diameter of the rolling element, for example, it can be between 92-96% of the diameter of the rolling element to ensure that the pocket 30 will not detach from the rolling element even in the non-load-bearing area C under high speed or vibration conditions. As a further preferred embodiment, the size of the lock opening 30b at the position corresponding to the transition position (pitch circle position) b is only slightly smaller than the diameter of the rolling element, for example, it can be between 97% and 99% of the diameter of the rolling element, so as to prevent the prongs 20 from being excessively squeezed in the circumferential direction by the rolling elements during the assembly of the rolling elements, which is particularly advantageous for the assembling operation of the rolling elements.

It can be seen from FIGS. 3 to 5 that the free ends 20a of the prongs 20 constituting the lock openings 30b have a significant thickness in the circumferential direction (compared to the prior art), and the angular contours are all designed with obtuse angles and rounded corners. The above structure can not only improve the strength and rigidity of the locks, but also is easy to use 3D printing technology for production. The thick prong structure can make up for the low elastic modulus of 3D printing materials.

It should be noted that the above specific embodiments and related technical features may only be applied to part of the pockets of the cage. This part of the pockets, for example, can be distributed in the entire cage circumference at intervals, so as to partially play the role of adjusting the pocket clearance as described above and achieve the corresponding technical effects. Therefore, this part of the pockets should also belong to the protection scope of the present invention.

The cage of the above structure can be widely used in thin-walled bearings, harmonic drives and related machinery devices. Those skilled in the art should understand that the cage and the applications thereof are not limited by the above specific embodiments. More general technical solutions will be subject to the limitations in the appended claims. For any changes and improvements of the present invention, as long as they meet the limitations of the appended claims, they fall within the protection scope of the present invention.

The invention claimed is:

1. A ball bearing cage comprising:
a backbone extending circumferentially around an axis of rotation;
a plurality of pockets located on the backbone each configured to receive a spherical rolling element, each of the plurality of pockets being partially defined by a pair of adjacent prongs extending from the backbone, each of the plurality of pockets having a first radial side and a second radial side, wherein the first radial side is radially spaced from the second radial side relative to the axis of rotation such that the pair of adjacent prongs are located between the first radial side and the second radial side, wherein
at least one of the plurality of pockets has a substantially conical inner surface, located between the adjacent prongs, whose diameter as measured in the circumferential direction increases when moving along the conical inner surface in a radial direction relative to the axis of rotation, and
wherein a free end of each of the adjacent prongs is wider than a transverse section of the adjacent prongs.

2. The cage according to claim 1, wherein the diameter of the conical inner surface which affects the spherical rolling element therein increases as the spherical rolling element moves from an upper limit position (a), which is a first distance that is measured radially from the axis of rotation, to a lower limit position (c), which is located a second distance that is measured radially from the axis of rotation, the second distance being less than the first distance.

3. The cage according to claim 1, wherein the substantially conical inner surface is a substantially elliptical cone surface having, in the radial view of the bearing, a major axis of a roughly elliptical cross-section being consistent with the circumferential direction of the bearing and a minor axis being consistent with the axial direction of the bearing.

4. The cage according to claim 3, wherein the ratio of the major axis to the minor axis of the substantially in the direction of the major axis is between 1.02 and 1.10.

5. The cage according to claim 4, wherein the conicity of the substantially elliptical cone surface in the direction of the major axis is between 0.4 and 0.6.

6. The cage according to claim 1, wherein the cage is a one-way plug-in cage, including a substantially annular backbone and prongs extending from the backbone to one side in the axial direction, the pocket being formed between the adjacent prongs, and the free ends of the adjacent prongs forming a lock opening of the pocket between the inner sides of the opening of the pocket, the size of the lock opening is gradually reduced from the outside to the inside in the radial direction of the bearing, with the size at the position corresponding to the lower limit position being between 92-96% of the diameter of the rolling element.

7. The cage according to claim 6, wherein the size of the lock opening at the position (b) corresponding to the pitch circle in the radial direction of the bearing is between 97% and 99% of the diameter of the rolling element.

8. A ball bearing comprising an inner ring, an outer ring, and at least one row of spherical rolling elements arranged between the inner and outer rings, wherein the at least one row of spherical rolling elements is provided with a ball bearing cage of claim 1.

9. A harmonic drive comprising:
a rigid circular spline with internal teeth,
a flexible spline with external teeth, and
a wave generator for radial deformation of the flexible spline, wherein the wave generator comprises an elliptical cam and a ball bearing comprising an inner ring, an outer ring, and at least one row of spherical rolling elements arranged between the inner and outer rings, wherein the at least one row of spherical rolling elements is provided with a ball bearing cage of claim 1, and wherein the ball bearing is fitted on the cam.

10. A machinery device comprising a harmonic drive providing a rigid cellular spline with internal teeth, a flexible spline with external teeth, and a wave generator for radial deformation of the flexible spline, wherein the wave generator comprises an elliptical cam and a ball bearing comprising an inner ring, an outer ring, and at least one row of spherical rolling elements arranged between the inner and outer rings, wherein the at least one row of spherical rolling elements is provided with a ball bearing cage of claim 1, and wherein the ball bearing is fitted on the cam.

* * * * *